Dec. 7, 1937.   A. O. GROOMS   2,101,498
REFRIGERATING APPARATUS
Filed June 27, 1935   2 Sheets-Sheet 1

INVENTOR.
Albert O. Grooms
BY
Spencer Hardman and Fehr
ATTORNEYS

Dec. 7, 1937.  A. O. GROOMS  2,101,498
REFRIGERATING APPARATUS
Filed June 27, 1935  2 Sheets-Sheet 2

INVENTOR.
Albert O Grooms
BY
ATTORNEYS

Patented Dec. 7, 1937

2,101,498

UNITED STATES PATENT OFFICE 2,101,498

REFRIGERATING APPARATUS

Albert O. Grooms, Dayton, Ohio, assignor to General Motors Corporation, Dayton, Ohio, a corporation of Delaware Application June 27, 1935, Serial No. 28,685

4 Claims. (Cl. 62—4)

This invention relates to refrigerating apparatus and more particularly to control means therefor.

In household refrigerators, the refrigerating system is not only called upon to cool the food compartment of the refrigerator, but also to freeze ice cubes and comestibles. For simplicity, a single refrigerating system is used for these dual purposes and in order to maintain proper control over the freezing function of the refrigerating system, the control of the system has been by the evaporator temperature. Under average conditions, this is fairly satisfactory, but under adverse conditions, such as when the outside temperature is excessively high or abnormally low, it has been found that the food compartment either becomes too warm in the first instance, or too cold in the second instance.

It is, therefore, an object of my invention to provide a refrigerating apparatus which is controlled according to the temperature of the evaporator, but which control is compensated by the temperature of the food compartment so as to prevent undesirable food compartment temperatures.

It is another object of my invention to provide a refrigerating apparatus which is controlled according to the temperature of the evaporating means and the fluid cooled by the evaporating means, one of which serves as the main control for the refrigerating system and the other of which serves as a compensating control.

Further objects and advantages of the present invention will be apparent from the following description, reference being had to the accompanying drawings, wherein a preferred form of the present invention is clearly shown.

Figure 1:
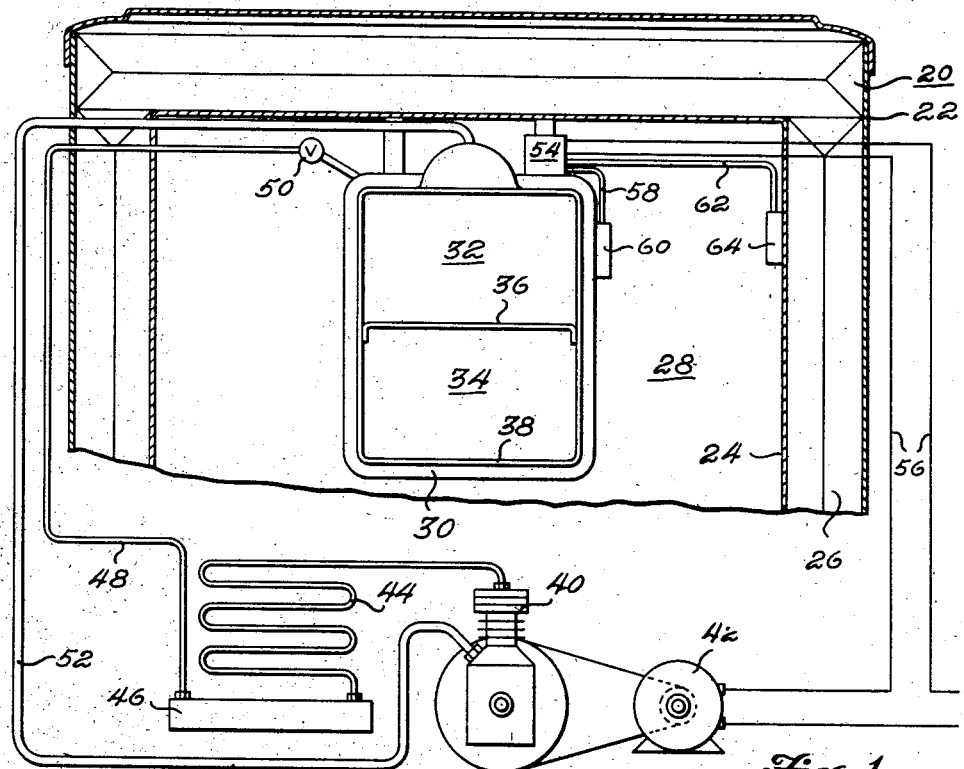
Fig. 1 is a fragmentary view, partly diagrammatic, of a refrigerating apparatus embodying my invention.
Figure 2:
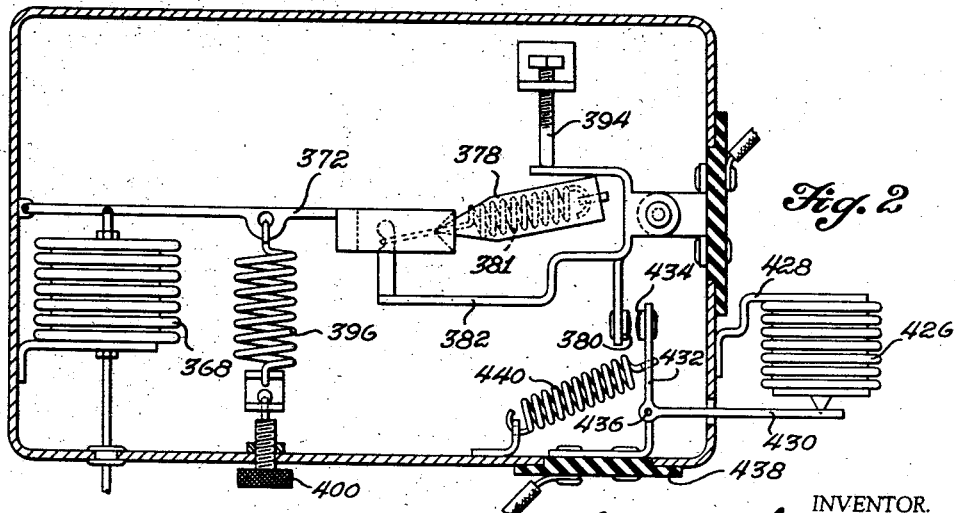
Fig. 2 is a modified form of control means for the apparatus shown in Fig. 1.
Figures 3, 4:
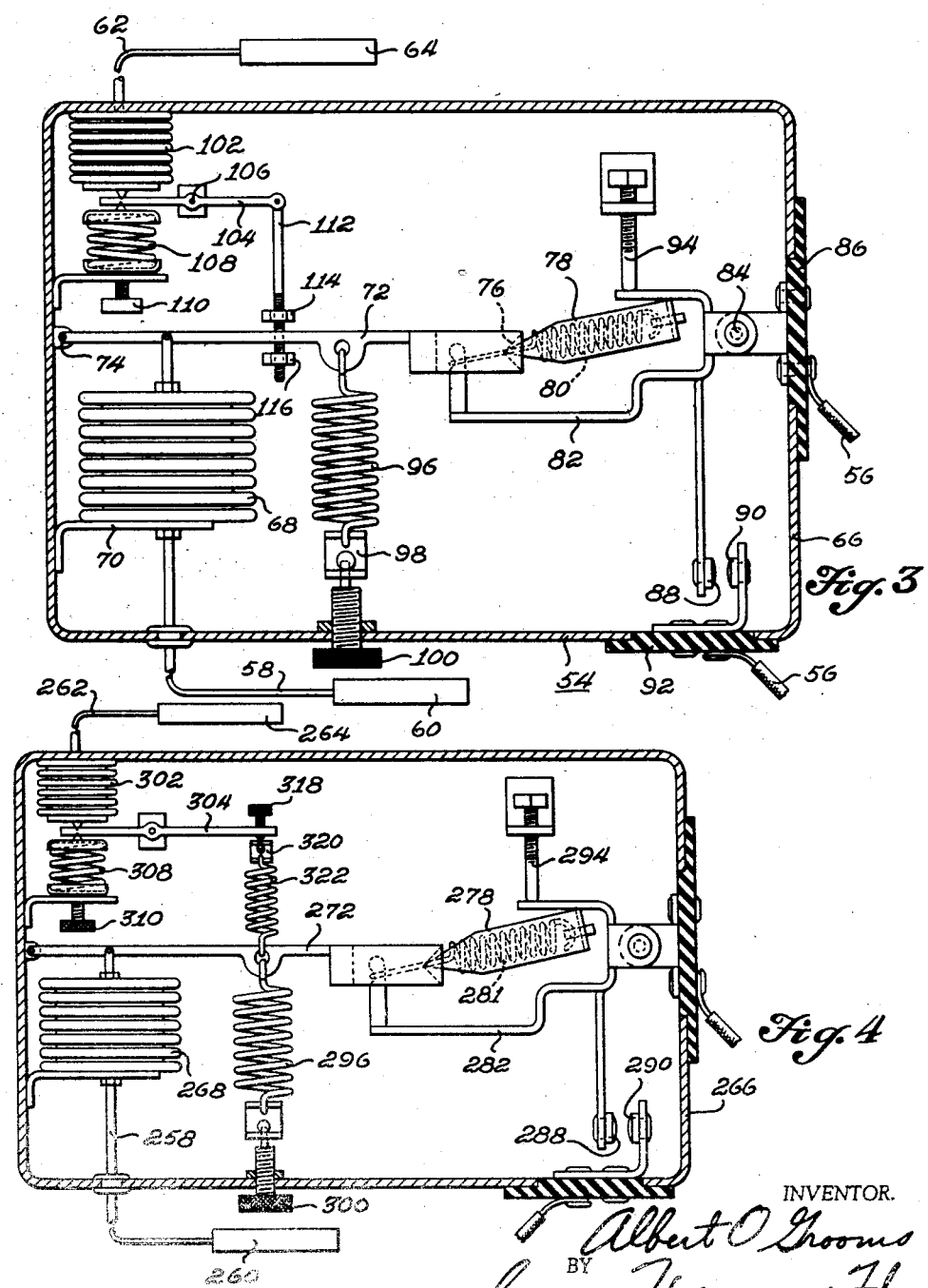
Fig. 3 is a sectional view of the control means shown in Fig. 1.
Fig. 4 is another modified form of control means for the apparatus shown in Fig. 1.

In my disclosure, I have shown a domestic refrigerating apparatus having a cooling unit or evaporating means capable of receiving ice trays for freezing purposes and provided with a control means mounted thereon and having a thermostatic bulb in contact with the wall of the cooling unit which forms the main actuating means for the control means for controlling the operation of the compressor. This control means also has a second thermostatic bulb and bellows responsive to the temperature of the air within the food compartment. This thermostatic bulb is preferably located so as to either be responsive to the warmest temperature in the food compartment, or to reflect the average air temperature within the food compartment. This second thermostatic bulb and bellows are provided for compensating the switch so as to prevent the food compartment from becoming too cold or too warm. There are three different forms shown; in the one shown in Figs. 1 and 3, the compressor switch is prevented from closing or tending to be prevented from closing when the box temperature is low and which is prevented from opening or tending to be prevented from opening when the box or food compartment temperature is high. In Fig. 2 the form is shown in which the lower evaporator temperature limit of the control means is changed according to the temperature of the air within the food compartment. In Fig. 4, another form is shown in which the upper and lower evaporator temperature limits are changed according to the temperature of the air within the food compartment.

Referring now more particularly to the drawings, there is shown a refrigerator cabinet, generally designated by the reference character 20 having outer metal walls 22, inner metal walls 24, and insulating means 26 between the inner and outer metal walls. The inner metal walls 24 surround a food or cold storage compartment 28 containing a cooling unit or refrigerant evaporating means 30 having ice freezing chambers 32 and 34 containing shelves 36 and 38 for receiving ice trays. The evaporating means 30 is supplied with liquid refrigerant by a compressor 40 driven by an electric motor 42 for compressing the refrigerant and for forwarding the compressed refrigerant to a condenser 44 where the compressed refrigerant is liquefied and collected in a receiver 46. The liquid refrigerant is forwarded to the evaporating means through a supply conduit 48 under the control of a suitable form of valve or restrictor 50 such as an expansion valve or high side float. From the evaporating means, the liquid refrigerant is returned to the compressor through the return conduit 52.

It has become rather popular to mount the control means of the refrigerating system upon the evaporator. This is convenient from several standpoints, since the thermostatic bulb must be connected with the evaporating means in some suitable way and since when so located, the control means requires no connections other than the electrical conductors extending through the walls of the refrigerator cabinet. I have, therefore, shown my control means, generally designated by the reference character 54, connected by the electrical conductors 56 through the walls of the cabinet to the electric circuit of the electric motor 42. This control means 54 is connected by a small tube 58 to a thermostatic bulb 60 mounted in direct heat exchange relation with a side wall portion of the evaporating means 30 and is connected by a similar, but longer tube 62, to a thermostatic bulb 64 mounted upon the side wall of the inner metal walls 24 and in heat exchange relation therewith so this bulb may receive an indication of increased food compartment temperatures as early as possible.

Referring now more particularly to Fig. 3 for a more complete disclosure of the control means 54, there is shown a casing 66 in which the tube 58 and the thermostatic bulb 60 are connected to the fixed end of a metal bellows 68 which is mounted upon a platform 70 extending from a side wall of the casing 66. The free end of the bellows 68 is connected to a primary lever 72 provided with a pivot 74 upon the wall of the casing and provided with a pair of notches 76 at its opposite end which receive the knife edges formed upon the adjacent ends of the secondary lever 78. This secondary lever 78 is connected by a tension toggle spring 80 to a contact carrying lever 82 pivoted upon the pivot pin 84 to an insulated portion 86 of the wall of the control casing 66. This lever 82 is provided with a contact 88 which cooperates with a contact 90 mounted upon an insulated portion 92 of the casing 66. The contact 90 is connected to one of the conductors of the control circuit 56, while the pivot pin 84 is connected to another of the conductors of the circuit 56. The movement of the lever 82 is controlled in one direction by the contact 90 and in the opposite direction by a set screw 94 which may be moved to change the range of movement of the lever 82 and in that way to change the differential of the switch. The range control of the switch is provided by a tension spring 96 connected at one end to a lever 72 and at its opposite end through a connector 98 to an adjusting screw 100 which is provided for adjusting or changing the range of the switch as desired.

The portion of the control means thus far described provides a control which controls the operation of the refrigerating system and the temperature of the evaporating means directly according to the temperature of the evaporating means. Therefore, if an abnormal food load is placed within the refrigerating system, or warm ice trays are placed within the cooling unit or if the temperature without the cabinet changes to a marked degree, the temperature of the air in the food compartment is materially changed and at times may become either too warm or too cold.

In order to avoid this undesirable circumstance, which if not properly attended to may even cause freezing of the food within the food compartment, I have provided an additional or compensating control in my control means which, of course, includes the thermostatic bulb 64 and the tube 62 which are connected to the bellows 102 mounted upon the wall of the casing 66 which acts upon a lever 104 pivoted at 106 to a projection from the wall of the casing. The expansion of the bellows 102 is controlled by the compression spring 108 which has its tension controlled by an adjusting screw 110 provided for changing the compensating effect of the bellows 102, the tube 62 and the thermostat 64 which preferably contain a volatile liquid or some sort of thermally expansible fluid. At the free end of the lever 104, there is connected a rod 112 which has a threaded portion extending through an aperture in the primary lever 72 provided with nuts 114 and 116 on either side of the primary lever 72.

These two nuts 114 are spaced far enough apart and a set screw 110 is normally so adjusted that when the temperature of the air within the food compartment is within a desirable range, such as between 42 and 45° F., or possibly between 40 and 50° F., these nuts 114 and 116 are entirely out of the path of the primary lever 72 and under such conditions, the refrigerating system is controlled altogether according to the evaporator temperature. Thus, should the temperature within the food compartment 28 become too cold, such as below 40 or 42° F., the bellows 102 will contract and move the nut 114 into the path of the primary lever 72 so as to prevent or tend to prevent the primary lever from being moved upwardly a sufficient distance to trip the toggle mechanism to circuit closing position. Thus, the operation of the electric motor and the compressor would be stopped if they were in operation or they would be prevented from starting when not in operation under such conditions. If the temperature of the air in the food compartment should become too warm, the bellows 102 will expand and move the nut 116 into the path of the primary lever 72 so as to prevent or tend to prevent the primary lever 72 from moving a sufficient distance in the downward direction to cause the toggle mechanism to trip the contacts to open circuit position. Thus, when the temperature within the food compartment rises above 45 or 50° F., the electric motor and the compressor will either be started or made to continue operation. While I have described this apparatus as particularly applied to a domestic refrigerator cabinet, it is obvious that the system of control may be applied wherever an evaporator is used to cool a fluid.

In Fig. 4, I have shown a modified form of control means which at first glance bears a close resemblance to the control means shown in Fig. 3, but which is provided with a somewhat different form of action in its compensating control. In this form, there is shown a casing 266 provided with a bellows 268 corresponding to the bellows 68 and connected by a tube 258 to a thermostat 260 which corresponds to the thermostatic bulb 60. This switch also has a primary lever 272, a secondary lever 278, a toggle spring 281 and a contact carrying lever 282 provided with a contact 288 cooperating with a contact 290 in a manner altogether similar to the form shown in Fig. 3. A set screw 294 is similarly provided for the differential adjustment and a tension spring 296 and an adjusting screw 300 are similarly provided for the range adjustment. The compensating control in a similar way includes a thermostatic bulb 264, a tube 262, a bellows 302 and a compression spring 308 and an adjusting screw 310 which operates a lever 304.

Thus far, the compensating mechanism is similar to that shown in Fig. 3. However, instead of providing a rod and nuts which are moved into the path of the primary lever, the lever 304 is connected by an adjusting screw 318, a connector 320 and a tension spring 322 with the primary lever 272. In this form of control, the bellows 268 tends to operate the switch mechanism according to the temperature of the evaporating means as interpreted by the thermostatic bulb 260, but the bellows 302 through the lever 304 and the spring 322 imposes a somewhat weaker force upon the switch mechanism according to the temperature of the air within the food compartment as interpreted by the thermostatic bulb 264. Thus, when the temperature of the food compartment is too cold, the bellows 302 contracts to reduce the tension upon the spring 322 so as to increase the effective load upon the bellows 268 in order to cause the switch to be moved to open position at a slightly higher low temperature limit of the switch mechanism and to close at a slightly higher evaporator temperature so as to prevent the food compartment from becoming too cold. When the food compartment is too warm, the reverse occurs and the bellows 302 expands to increase the tension of the spring 322 so as to reduce the effective load upon the bellows 268 and make it easier to move the switch mechanism to closed position. This, of course, will tend to lower the upper and lower temperature limits of the evaporator so as to provide increased refrigeration to prevent the food compartment from becoming too warm.

In Fig. 2, the switch mechanism similarly includes a bellows 368 which expands according to the evaporator temperature and which operates a primary lever 372, a secondary lever 378, a toggle spring 381 and a switch contact lever 382 carrying a switch contact 380. In a similar way, it is also provided with a differential adjusting screw 394 and a range spring 396 and a range adjusting screw 400. This switch or control mechanism however, differs from the other two in its compensating mechanism. For its compensating mechanism, this control shown in Fig. 2 is provided with a charged metal bellows 426 having its upper end fixed by a bracket 428 to a wall of the control housing and having its lower movable end acting upon the arm 430 of a bell crank lever which has a second arm 432 carrying a switch contact 434 which is adapted to be engaged by the contact 380 of the switch mechanism. This bell crank lever, having the arms 430 and 432, is pivoted upon a pivot pin 436 to a bracket held by an insulated portion 438 of the wall of the switch housing. A tension spring 440 is provided for holding the arm 430 in contact with the lower end of the charged bellows 426 and for imposing a sufficient load upon the bellows 426. This bellows 426 is exposed to the air within the food compartment and changes the position of the contact 434 so as to raise or lower the lower temperature limit, that is the cut-out temperature, of the switch mechanism according to the fall or rise in temperature of the air within the food compartment 28 so as to prevent the food compartment from becoming too cold or too warm. Thus, this form also provides effective compensation.

While the form of embodiment of the invention as herein disclosed constitutes a preferred form, it is to be understood that other forms might be adopted, all coming within the scope of the claims which follow.

What is claimed is as follows:

1. Refrigerating apparatus including an enclosure containing a fluid to be kept cool, a system associated with said enclosure comprising a cooling element in heat exchange relation with the fluid in the enclosure and a cooling medium circulating unit outside the enclosure, means dependent solely upon the temperature of the cooling element and providing the main control for normally controlling the operation of said circulating unit, and means disposed within said enclosure out of intimate thermal contact with said cooling element and acting directly upon said temperature dependent main control means for regulating same in response to the temperature of ambient fluid in said enclosure.

2. Refrigerating apparatus including an insulated compartment to be kept cool, a closed refrigerating system associated with said compartment comprising an evaporating means in heat exchange relation with air within the compartment and a refrigerant liquefying and circulating means outside of the compartment, means dependent solely upon the temperature of the refrigerant evaporating means and providing the main control for normally controlling the operation of said circulating means, and means disposed within said compartment out of intimate thermal contact with said evaporating means and acting directly upon said temperature dependent main control means for regulating same in response to the temperature of ambient air in said compartment.

3. Refrigerating apparatus including an insulated compartment to be kept cool, a closed refrigerating system associated with said compartment comprising an evaporating means in heat exchange relation with air within the compartment and a refrigerant liquefying and circulating means outside of the compartment, means dependent solely upon the temperature of the refrigerant evaporating means and providing the main control for normally starting the operation of the circulating means at a predetermined high evaporator temperature and normally stopping the operation of the circulating means at a predetermined low evaporator temperature, and means disposed within said compartment out of intimate thermal contact with said evaporating means and acting directly upon said temperature dependent main control means for changing one of the temperature limits at which same is responsive in response to the temperature of ambient air in said compartment.

4. Refrigerating apparatus including an insulated compartment to be kept cool, a closed refrigerating system associated with said compartment comprising an evaporating means in heat exchange relation with air within the compartment and a refrigerant liquefying and circulating means outside of the compartment, means dependent solely upon the temperature of the refrigerant evaporating means and providing the main control for normally starting the operation of the circulating means at a predetermined high evaporator temperature and normally stopping the operation of the circulating means at a predetermined low evaporator temperature, and means disposed within said compartment out of intimate thermal contact with said evaporating means and acting directly upon said temperature dependent main control means for preventing operation of said circulating means and flow of refrigerant through said evaporating means in response to a low temperature of ambient fluid in said compartment.

ALBERT O. GROOMS.